US 11,188,331 B2

(12) United States Patent
Croxford et al.

(10) Patent No.: US 11,188,331 B2
(45) Date of Patent: Nov. 30, 2021

(54) PROCESSOR INSTRUCTION SPECIFYING INDEXED STORAGE REGION HOLDING CONTROL DATA FOR SWIZZLE OPERATION

(71) Applicants: Arm Limited, Cambridge (GB); Apical Limited, Cambridge (GB)

(72) Inventors: Daren Croxford, Cambridge (GB); Michel Patrick Gabriel Emil Iwaniec, Cambridge (GB); Rune Holm, Cambridge (GB); Diego Lopez Recas, Cambridge (GB)

(73) Assignees: Arm Limited, Cambridge (GB); Apical Limited, Cambridge (GB)

( * ) Notice: Subject to any disclaimer, the term of this patent is extended or adjusted under 35 U.S.C. 154(b) by 0 days.

(21) Appl. No.: 16/576,505

(22) Filed: Sep. 19, 2019

(65) Prior Publication Data
US 2020/0110607 A1    Apr. 9, 2020

(30) Foreign Application Priority Data

Oct. 8, 2018   (GB) ..................... 1816402

(51) Int. Cl.
*G06F 9/30*   (2018.01)
*G06F 9/38*   (2018.01)

(52) U.S. Cl.
CPC ...... *G06F 9/30101* (2013.01); *G06F 9/30032* (2013.01); *G06F 9/30036* (2013.01); *G06F 9/3877* (2013.01)

(58) Field of Classification Search
CPC .... G06F 9/3877; G06F 9/3879; G06F 9/3881; G06F 9/00–3897; G06F 15/00–825
See application file for complete search history.

(56) References Cited

U.S. PATENT DOCUMENTS 6,744,928 B1 *  6/2004  Juri ..................... H04N 19/176
                                          375/E7.088
7,809,931 B2 * 10/2010  Raubuch ............. G06F 15/8084
                                          712/221

(Continued)

FOREIGN PATENT DOCUMENTS

CN         102253824 A      11/2011

OTHER PUBLICATIONS

United Kingdom Combined Search and Exam Report dated Mar. 28, 2019 for Application No. GB1816402.0.

*Primary Examiner* — Keith E Vicary
(74) *Attorney, Agent, or Firm* — EIP US LLP

(57) ABSTRACT

A data processing system includes: a processor; a data interface for communication with a control unit, the processor being on one side of the data interface; internal storage accessible by the processor, the internal storage being on the same side of the data interface as the processor; and a register array accessible by the processor and comprising a plurality of registers, each register having a plurality of vector lanes. The storage is arranged to store control data indicating an ordered selection of vector lanes of one or more of the registers. The processor is arranged to, in response to receiving instruction data from a control unit, perform a swizzle operation in which data is selected from one or more source registers in the register array, and transferred to a destination register. The data is selected from vector lanes in accordance with control data stored in the internal storage.

17 Claims, 15 Drawing Sheets

(56) References Cited

U.S. PATENT DOCUMENTS

| | | | |
|---|---|---|---|
| 2007/0106882 A1* | 5/2007 | Thornton | G06F 9/30032 712/223 |
| 2009/0228681 A1* | 9/2009 | Mejdrich | G06F 9/30123 712/7 |
| 2009/0228682 A1* | 9/2009 | Mejdrich | G06F 9/30036 712/7 |
| 2010/0106940 A1* | 4/2010 | Muff | G06F 9/30145 712/7 |
| 2011/0276790 A1* | 11/2011 | Olson | G06F 9/30014 712/222 |
| 2013/0067203 A1* | 3/2013 | Chung | G06F 9/30036 712/222 |
| 2015/0039851 A1* | 2/2015 | Uliel | G06F 9/30036 712/4 |
| 2015/0052332 A1* | 2/2015 | Mortensen | G06F 9/3879 712/37 |
| 2017/0236053 A1* | 8/2017 | Lavigueur | G06N 3/0454 706/31 |

* cited by examiner

| $C_d^{(0)}$ | $d_A$ | $d_8$ | $c_A$ | $c_8$ | $d_2$ | $d_0$ | $c_2$ | $c_0$ | $b_A$ | $b_8$ | $a_A$ | $a_8$ | $b_2$ | $b_0$ | $a_2$ | $a_0$ |
|---|---|---|---|---|---|---|---|---|---|---|---|---|---|---|---|---|
| $LS^{(0)}$ | A | 8 | A | 8 | 2 | 0 | 2 | 0 | A | 8 | A | 8 | 2 | 0 | 2 | 0 |
| $RS^{(0)}$ | 3 | 3 | 2 | 2 | 3 | 3 | 2 | 2 | 1 | 1 | 0 | 0 | 1 | 1 | 0 | 0 |

| $C_d^{(1)}$ | $d_B$ | $d_9$ | $c_B$ | $c_9$ | $d_3$ | $d_1$ | $c_3$ | $c_1$ | $b_B$ | $b_9$ | $a_B$ | $a_9$ | $b_3$ | $b_1$ | $a_3$ | $a_1$ |
|---|---|---|---|---|---|---|---|---|---|---|---|---|---|---|---|---|
| $LS^{(1)}$ | B | 9 | B | 9 | 3 | 1 | 3 | 1 | B | 9 | B | 9 | 3 | 1 | 3 | 1 |
| $RS^{(1)}$ | 3 | 3 | 2 | 2 | 3 | 3 | 2 | 2 | 1 | 1 | 0 | 0 | 1 | 1 | 0 | 0 |

| $C_d^{(2)}$ | $d_E$ | $d_C$ | $c_E$ | $c_C$ | $d_6$ | $d_4$ | $c_6$ | $c_4$ | $b_E$ | $b_C$ | $a_E$ | $a_C$ | $b_6$ | $b_4$ | $a_6$ | $a_4$ |
|---|---|---|---|---|---|---|---|---|---|---|---|---|---|---|---|---|
| $LS^{(2)}$ | E | C | E | C | 6 | 4 | 6 | 4 | E | C | E | C | 6 | 4 | 6 | 4 |
| $RS^{(2)}$ | 3 | 3 | 2 | 2 | 3 | 3 | 2 | 2 | 1 | 1 | 0 | 0 | 1 | 1 | 0 | 0 |

| $C_d^{(3)}$ | $d_F$ | $d_D$ | $c_F$ | $c_D$ | $d_7$ | $d_5$ | $c_7$ | $c_5$ | $b_F$ | $b_D$ | $a_F$ | $a_D$ | $b_7$ | $b_5$ | $a_7$ | $a_5$ |
|---|---|---|---|---|---|---|---|---|---|---|---|---|---|---|---|---|
| $LS^{(3)}$ | F | D | F | D | 7 | 5 | 7 | 5 | F | D | F | D | 7 | 5 | 7 | 5 |
| $RS^{(3)}$ | 3 | 3 | 2 | 2 | 3 | 3 | 2 | 2 | 1 | 1 | 0 | 0 | 1 | 1 | 0 | 0 |

Fig. 9

| $a_3$ $+b_0$ $+b_1$ | $b_0$ $+b_1$ $+b_2$ | $b_1$ $+b_2$ $+b_3$ | $b_2$ $+b_3$ $+c_0$ |
|---|---|---|---|
| $a_7$ $+b_4$ $+b_5$ | $b_4$ $+b_5$ $+b_6$ | $b_5$ $+b_6$ $+b_7$ | $b_6$ $+b_7$ $+c_4$ |
| $a_B$ $+b_8$ $+b_9$ | $b_8$ $+b_9$ $+b_A$ | $b_9$ $+b_A$ $+b_B$ | $b_A$ $+b_B$ $+c_8$ |
| $a_F$ $+b_C$ $+b_D$ | $b_C$ $+b_D$ $+b_E$ | $b_D$ $+b_E$ $+b_F$ | $b_E$ $+b_F$ $+c_C$ |

|   |   |   |   |
|---|---|---|---|
| 9 | 9 | 9 | 9 |
| 9 | 9 | 9 | 9 |
| 9 | 9 | 9 | 9 |
| 9 | 9 | 9 | 9 |

Fig. 12B

|   |   |   |   |
|---|---|---|---|
| 6 | 6 | 6 | 6 |
| 9 | 9 | 9 | 9 |
| 9 | 9 | 9 | 9 |
| 9 | 9 | 9 | 9 |

Fig. 12C

|   |   |   |   |
|---|---|---|---|
| 4 | 6 | 6 | 6 |
| 6 | 9 | 9 | 9 |
| 6 | 9 | 9 | 9 |
| 6 | 9 | 9 | 9 |

Fig. 12D

PROCESSOR INSTRUCTION SPECIFYING INDEXED STORAGE REGION HOLDING CONTROL DATA FOR SWIZZLE OPERATION

CROSS-REFERENCE TO RELATED APPLICATIONS

This application claims priority to UK Application No. GB 1816402.0, filed Oct. 8, 2018, under 35 U.S.C. § 119(a). The above-referenced patent application is incorporated by reference in its entirety.

BACKGROUND OF THE INVENTION

Field of the Invention

The present invention relates to the processing of data by a processor such as a coprocessor. The invention has particular, but not exclusive, relevance to the processing of data within a neural network such as a convolutional neural network (CNN).

Description of the Related Technology

Processing of input data by a convolutional layer of a convolutional neural network (CNN) may be performed efficiently using a convolutional neural network accelerator (CNNA). Such processing typically involves a first stage in which the input data is convolved with a kernel, and a subsequent second stage in which further operations are performed on the convolved data (for example, pooling and/or application of an activation function). For efficient implementations, the convolved data output by the first stage of processing may be passed to registers within the CNNA for the subsequent processing, reducing the need to transfer data to larger, slower memories such as internal static random access memory (SRAM) of the CNNA or external synchronous dynamic random access memory (SDRAM) of a computing device comprising the CNNA.

Data output by the first stage of processing may be highly interleaved and accordingly not in a suitable format for the subsequent processing. Furthermore, the subsequent processing may be layer-dependent and/or network-dependent. Processing routines for arranging data into suitable formats for processing require a large number of Central Processing Unit (CPU) instructions to be executed, particularly if a variety of different parallel processing operations are to be performed, and are therefore typically inefficient.

SUMMARY

According to a first aspect of the present invention, there is provided a data processing system. The data processing system includes: a processor; a data interface for communication with a control unit, the processor being on one side of the data interface; internal storage accessible by the processor, the internal storage being on the same side of the data interface as the processor; and a register array accessible by the processor and comprising a plurality of registers, each register having a plurality of vector lanes. The internal storage is arranged to store control data indicating an ordered selection of vector lanes of one or more of the plurality of registers. The processor is arranged to, in response to receiving instruction data from the control unit, perform a swizzle operation in which data is selected from one or more source registers in the register array, and transferred to a destination register. The data is selected from vector lanes in accordance with control data stored in the internal storage.

By storing control data in internal storage which is directly accessible to the processor, the volume of data that is required to be transferred in a swizzle instruction is reduced. For data processing routines in which a large number of swizzle instructions are required, this significantly reduces memory occupied by the swizzle instructions. Further, the control data can be reused quickly and efficiently in data processing routines where the same swizzle instructions are issued repeatedly. Accordingly, performing a swizzle operation in this way reduces the number of instructions that need to be executed to transfer control data, increasing efficiency. In some examples, the internal storage is programmable, providing flexibility.

In some examples, the processor is operable to perform logical vector operations on data stored in one or more registers in the register array. In comparison to logical scalar operations, vector operations can reduce memory bandwidth occupied within a data processing system as fewer instructions are required to be fetched and decoded to perform an equivalent amount of processing. Combining vector processing with compact swizzle instructions and efficient swizzle operations allows a variety of processing routines to be performed efficiently and using a low memory bandwidth.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 8A and 8B show schematically an example of feature map data stored in registers of a register array;

FIG. 9 shows schematically an example of feature map data stored in registers of a register array after swizzle operations have been executed in a max pooling operation;

FIGS. 12A-12D show schematically an example of feature map data patches processed in an average pooling operation;

DETAILED DESCRIPTION OF CERTAIN INVENTIVE EMBODIMENTS

Figure 1:
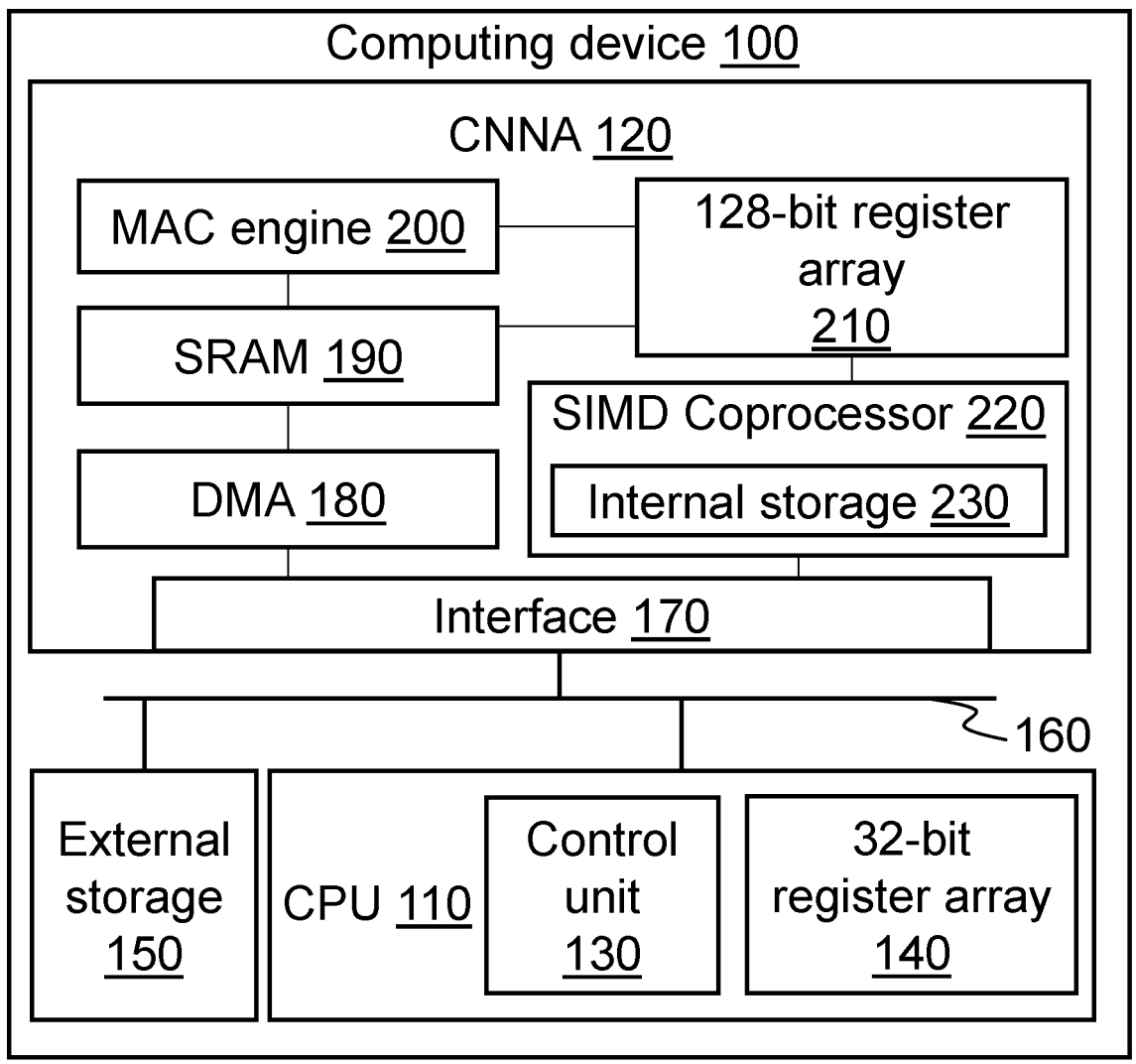
FIG. 1 is a schematic block diagram showing a computing device for performing data processing operations in accordance with the present invention.

FIG. 1 shows an example of a computing device 100 according to the present invention. The computing device 100 in this example is configured to perform classification of image data, as will be described in more detail below. The computing device 100 of FIG. 1 is a personal computer. However, in other examples, the methods described herein may be performed using other computing devices or data processing systems such as a smartphone, a laptop, a tablet or an on-board computer device which may be coupled to or mounted within a vehicle such as a car.

The computing device 100 includes at least one processor. In this example, the computing device 100 includes a central processor unit (CPU) 110. The computing device 100 also includes a convolutional neural network accelerator (CNNA) 120, which includes processing circuitry dedicated to performing inference routines according to a convolutional neural network (CNN) architecture. In other examples, a computing device may include other or alternative processors such as a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A computing device may additionally or alternatively include a processor implemented as a combination of computing devices, e.g., a combination of a DSP and a microprocessor, a plurality of microprocessors, one or more microprocessors in conjunction with a DSP core, or any other such configuration. A computer device may additionally or alternatively include at least one graphics processing unit (GPU). In some examples, a CNN may be implemented using a more general processor than a CNNA, such as a CPU, a GPU, or a DSP.

The CPU 110 includes a control unit 130, which is arranged to provide instructions to other components of the computing device, including components of the CNNA 120. The CPU 110 in this example is a 32-bit processor, and accordingly is arranged to process 32-bit data. The CPU 110 includes a 32-bit register array 140 (which may alternatively be referred to as a 32-bit register file), which includes a plurality of registers each able to store up to 32 bits of data. In other examples, a CPU may be arranged to process data having a different data size, for example 64-bit data.

The computing device 100 includes external storage 150 which is external to the CNNA 120. The external storage 150 includes random access memory (RAM) such as DDR-SDRAM (double data rate synchronous dynamic random access memory) and non-volatile storage. Examples of non-volatile storage are Read Only Memory (ROM) and solid state drive (SSD) such as Flash memory. In other examples, external storage may include further storage devices, for example magnetic, optical or tape media, compact disc (CD), digital versatile disc (DVD) or other data storage media. External storage may be removable or non-removable from a computing device.

The components of the computing device 100 in the example of FIG. 1 are interconnected using a systems bus 160, which allows data to be transferred between the various components of the computing device 100. The bus 160 may be or include any suitable interface or bus. For example, an ARM® Advanced Microcontroller Bus Architecture (AMBA®) interface, such as the Advanced eXtensible Interface (AXI), may be used. In the present example, the bus 160 is a 128-bit bus, and accordingly allows for 128-bit instructions, or 128 bits of data, to be transferred in a clock cycle of the computing device 100.

The CNNA 120 includes a data interface 170 for communication with the control unit 130, via which input data may be received for processing by the CNNA 120, for example from other components of the computing device 100, such as the CPU 110 or the external storage 150. Examples of input data which may be received by the CNNA 120 via the interface 170 include instruction data from the CPU 110, and image data representative of an image to be processed using a CNN, and kernel data representative of a kernel associated with a CNN after training, as will be described in more detail hereafter.

The CNNA 120 of FIG. 1 includes a direct memory access (DMA) 180 which allows the CNNA 120 to access the external storage 150 directly, independently of the CPU 110. This may improve the speed at which the CNNA 120 is able to process input data. For example, the CNNA 120 may access input data for processing without having to wait for the CPU 110 to be available. For example, image data and kernel data may be stored in the external storage 150 and retrieved from the external storage 150 by the DMA 180.

The CNNA 120 includes static random access memory (SRAM) 190, which may be used to store input data for processing by the CNNA 120. The SRAM 190 may be on-chip or local memory of the CNNA 120, which is generally quicker to access than the external storage 150. The SRAM 190 may include a plurality of separate storage areas. For example, image data may be stored in a different storage area from kernel data (although, in some cases, they may be stored in the same storage area). Other data that may be stored in the SRAM 190 include input feature map data, output feature map data, and intermediate data for generating an output feature map. In the present example, in which the computing device 100 is configured to perform classification of image data, the SRAM 190 is arranged to store weight data representative of weights associated with a neural network. Hence, the weight data represents kernels to be convolved with image data, as described below. The SRAM 190 is further arranged to store image data representative of at least a portion of an image to be classified by the computing device 100. The image data may be in any suitable format and may for example represent pixel intensity values for respective pixels of an image. The image data may include data for each of a plurality of colour channels, such as the red, green and blue colour channels.

The CNNA 120 also includes a multiply-accumulate (MAC) engine 200, which includes an array of one or more MAC units, each of which is configured to perform a MAC operation. In this example, the MAC engine 200 further includes a plurality of MAC engine registers for storing data at various stages in a data processing operation. In an example in which the computing system 100 is used to classify image data, weight data and image data may be transferred from the SRAM 190 to the MAC engine registers, and processed by the MAC engine 200 as part of a convolution operation as will be described in more detail below. The MAC engine is arranged to output intermediate or partially-processed data representative of a portion of a feature map generated by the convolution operation. The MAC engine may perform multiple MAC operations per clock cycle of the computing device 100, for example up to 36 MAC operations per clock cycle.

The MAC engine 200 is arranged to output data to a vector register array 210 (which may alternatively be referred to a as a vector register file), which in this example is a 128-bit vector register array, and includes a plurality of 128-bit vector registers, each having a plurality of indexed vector lanes. In this example, each vector register has sixteen vector lanes, with each lane configured to hold one 8-bit data word. In other examples, vector registers may be configured to hold other sizes of data, for example 16-bit data, 32-bit data, or any other suitable size of data, and may each include more or fewer than sixteen vector lanes. In this example, the MAC engine 200 is configured to output 8-bit data representing a portion of a feature map.

The CNNA 120 includes a coprocessor 220 configured to receive instructions from the control unit 130 of the CPU 110. A coprocessor is a microprocessor designed to supplement the capabilities of a primary processor, for example a CPU, a GPU, or a DSP. In other examples, methods in accordance with the present invention may be performed by other types of processor, for example a CPU, a GPU, or a DSP. In the present example, the coprocessor 220 is a single instruction multiple data (SIMD) coprocessor, and is arranged to read input data from one or more registers in the register array 210, perform operations on the input data, and write output data to one or more registers in the register array 210, in accordance with instructions received from the control unit 130. The coprocessor 220 includes internal storage 230 that is accessible to the coprocessor 220. The internal storage 230 is located on the same side of the interface 170 of the CNNA 120 as the coprocessor 220, and accordingly may be accessed by the coprocessor 220 without transferring data over the system bus 160. In this example, the internal storage 230 includes a plurality of internal registers that are integrated within the coprocessor 220. In other examples, internal storage may not be integrated within a processor or coprocessor, but instead is directly accessible by the processor or coprocessor without transferring data over the system bus 160. The internal storage 230 may be used to hold control data relating to one or more specific data processing operations, as will be described in more detail hereafter.

In the present example, the coprocessor 220 is configured to perform logical vector operations on data stored within the registers of the register array 210. Each operand in a vector operation is a vector of values as opposed to a single value. In performing a vector operation, the coprocessor 220 simultaneously reads input data from each lane in one or more source registers, performs the same operation on the input data stored in each of the lanes to generate output data, and writes the output data to each lane of one or more destination registers. Performing vector operations in this way is an example of data-level parallelisation. In this example, the coprocessor reads data from, and writes data to, the same register array (register array 210), though in other examples, a processor or coprocessor may read input data from a first register array and write data to further registers, for example in a second register array.

Figure 2:
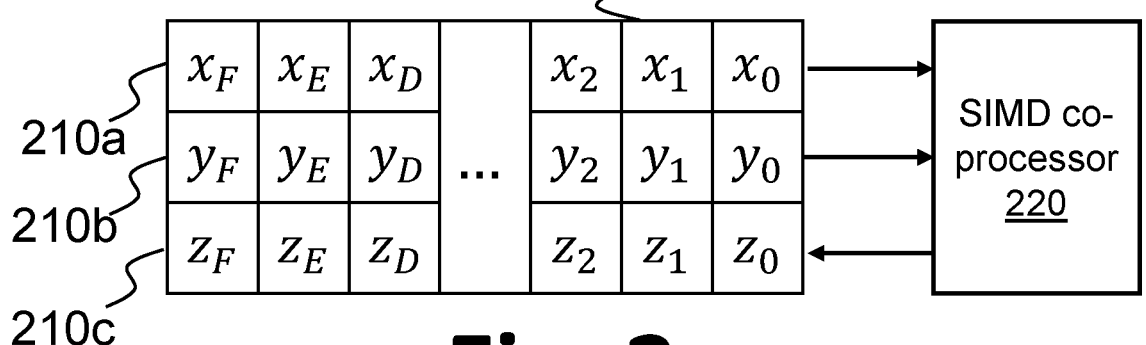
FIG. 2 is a schematic block diagram showing components of the computing device of FIG. 1.

In comparison to scalar operations (in which the operands are single data words) vector operations reduce memory bandwidth occupied within a data processing system as fewer instructions are required to be fetched and decoded to perform an equivalent amount of processing. Furthermore, vector operations increase the amount of data that is processed in each clock cycle of a computing device, resulting in faster processing. For data processing applications where large numbers of the same operation are performed regularly, vector operations can significantly reduce the time taken, and the memory bandwidth, for performing the data processing. Applying vector processing as described above to data stored within the register array 210 may reduce the number of times the SRAM 190 of the CNNA 120 or the external storage 150 of the computing device need to be accessed, further reducing the time taken to perform the data processing, FIG. 2 shows an example of a vector addition operation, in which the coprocessor 220 reads data from two source registers 210a and 210b, simultaneously performs an elementwise addition on the data stored in the two source registers 210a and 210b, and writes the resulting data to a destination register 210c. In this example, the coprocessor 220 reads sixteen 8-bit words $x_0, x_1, \ldots, x_F$ (where the words are indexed with hexadecimal values according to the indexed vector lanes in which they are stored) from the first source register 210a, and reads sixteen 8-bit words $y_0, y_1, \ldots, y_F$ from the second source register 210b. The coprocessor 220 simultaneously performs the operation $z_i \leftarrow x_i + y_i$ for $i=0, \ldots, F$, and writes the resulting words $z_0, z_1, \ldots, z_F$ to the destination register 210c.

Figure 3:
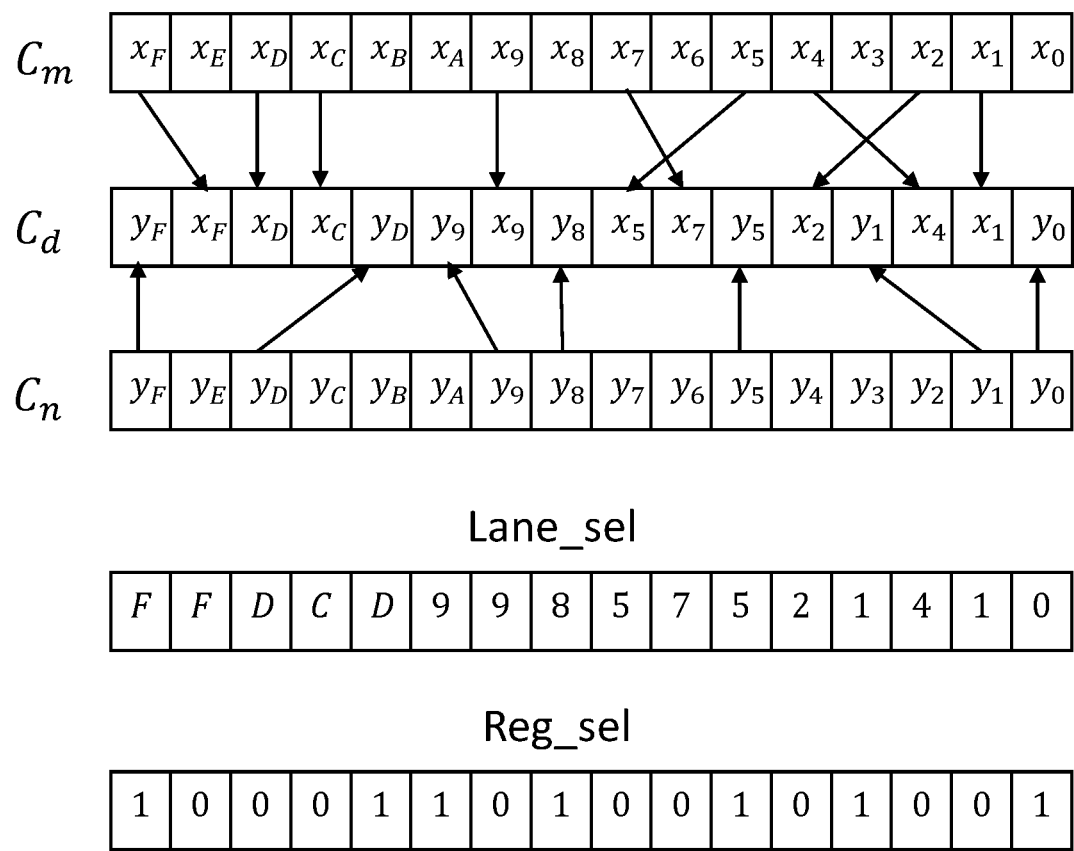
FIG. 3 shows an illustrative example of a swizzle operation.

FIG. 3 illustrates an example of a further data processing operation performed by the coprocessor 220 in accordance with the present invention. The operation of FIG. 3 is referred to a swizzle operation. In a swizzle operation, the coprocessor 220 selects data from one or more source registers and transfers the selected data to a destination register. The data transferred to the destination register includes an ordered selection of data words, each data word in the ordered selection selected in accordance with control data stored in the internal storage 230. In the example of FIG. 3, the internal storage 230 holds control data including "reg_sel" data indicating a sequence of register indexes, and "lane_sel" data indicating a sequence of vector lane indexes. In this example, two registers $C_m$ and $C_n$ are designated as source registers, and one register $C_d$ is designated as a destination register. The first source register $C_m$ is indexed with the binary number 0, and the second source register $C_n$ is indexed with the binary number 1. The sequence of register indexes stored as reg_sel data in the internal storage 230 is a sequence of sixteen binary numbers indicating which of the source registers $C_m$ and $C_n$ each data word is selected from. The sequence of vector lane indexes stored as lane_sel data in the internal storage 230 is a sequence of sixteen 4-bit data words indicating which vector lane of the appropriate source register $C_m$ or $C_n$ each data word is selected from. As shown in the example of FIG. 3, each word in the ordered selection of words transferred or written to the destination register $C_d$ is selected from a vector lane of one of the designated source registers in accordance with the reg_sel data and the lane_sel data. It is noted that the same vector lane of a designated source register may be selected multiple times, or not at all. It is emphasised that the format of the control data in FIG. 3 is only an example, and control data may alternatively be encoded differently, for example within a single sequence as opposed to two sequences. In any case, the data selected for a swizzle operation is selected from vector lanes in accordance with control data stored in internal storage directly accessible by a processor or coprocessor.

The swizzle operation in the example of FIG. 3 transfers sixteen 4-bit data words from two source registers in the register array 210 to a destination register. Accordingly, 16 bits of reg_sel data are required to specify the sequence of source registers, and 64 bits of lane_sel data are required to specify the sequence of vector lanes. In other examples, other sizes of source register and/or other data sizes may be used, resulting in different amounts of control data needing to be stored for a swizzle operation. Furthermore, in some examples, a swizzle operation may select data form more than two source registers, for example four or eight source registers.

Figure 4:
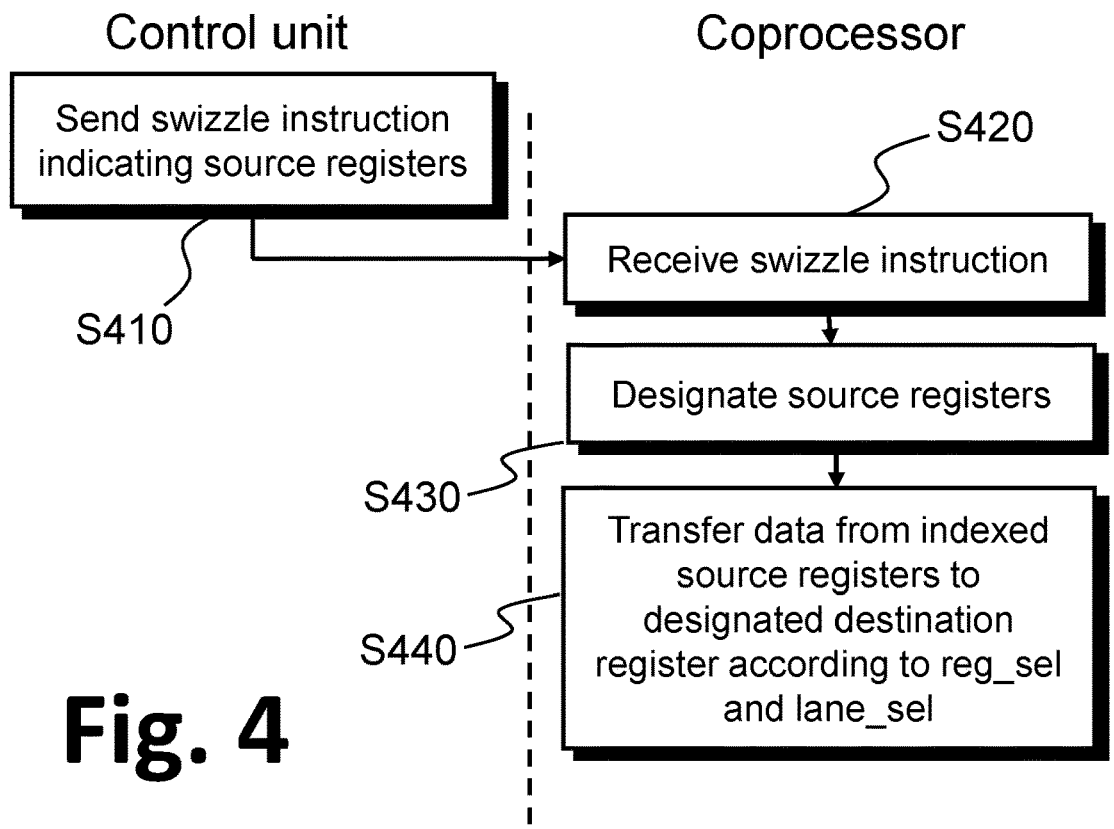
FIG. 4 is a flow diagram representing a data processing operation in accordance with the present invention.

As shown in FIG. 4, in order to initiate a swizzle operation, the control unit 130 of the CPU 110 sends, at S410, a swizzle instruction to the coprocessor 220. The swizzle instruction includes data fields containing addresses or other data indicative of a subset of the registers in the register array 210 to be designated as source registers. The registers in the indicated subset are indexed implicitly according to which data field they appear in. For example, the swizzle operation may contain four data fields, corresponding to indexes 0, 1, 2, 3, and each data field may contain an address or other data indicative of a register in the register array 210. The registers indicated by the four data fields are indexed 0, 1, 2, 3 accordingly. In this example, the swizzle instruction includes a further data field containing an address or other data indicative of a further register in the register array 210 to be designated as a destination register. In some examples, a swizzle instruction may omit data indicating a destination register and/or source registers, and instead the destination register and/or source registers are designated by default.

Upon receiving the swizzle instruction from the control unit 110 at S420, the coprocessor 220 designates, at S430, the indicated subset of registers as source registers for a swizzle operation. In this example, the coprocessor 220 also designates the indicated further register as a destination register.

The coprocessor 220 selects, at S440, data from the one or more designated source registers, and transfers the selected data to the designated destination register. As described above, the data selected for a swizzle operation is selected from vector lanes in accordance with control data stored in the internal storage 230. Specifically, in this example, the selected data comprises an ordered selection of data words, each word in the ordered selection selected from a vector lane of one of the designated source registers in accordance with reg_sel data and lane_sel data stored in the internal storage 230.

Storing control data in the internal storage 230, which is directly accessible to the coprocessor 220, reduces the volume of data that is required to be sent over the system bus 160 by the control unit 130 in a swizzle instruction. As a result, the swizzle instruction described above is relatively compact. For data processing routines in which a large number of swizzle operations are required (examples of which will be described hereafter), this significantly reduces memory bandwidth required to send the swizzle instructions. By storing control data in the internal storage 230, the control data can be reused quickly and efficiently in a data processing routine where the same swizzle instructions are issued repeatedly. Accordingly, performing a swizzle operation in this way reduces the number of instructions that need to be executed to transfer control data, increasing efficiency. In other examples, swizzle instruction data for a single swizzle instruction may be sent by a control unit as a series of instructions, as opposed to being sent as a single instruction.

In order to provide flexibility such that the coprocessor 220 may be employed for a range of different data processing routines, the internal storage 230 is programmable. Accordingly, the control data stored in the internal storage 230 may be configured for specific swizzle instructions corresponding to specific data processing routines. Some data processing routines, for example processing of image data by a CNN, may require several sets of swizzle instructions for different stages of the data processing routine. For example, processing data within a first layer of the CNN may use a first set of swizzle instructions, and processing data within a subsequent layer of the CNN may use a second set of swizzle instructions. The control data stored within the internal storage 230 may accordingly be updated after the processing associated with the first layer has been performed. Examples of specific data processing operations in the context of CNNs are described in more detail hereafter.

Figure 5:
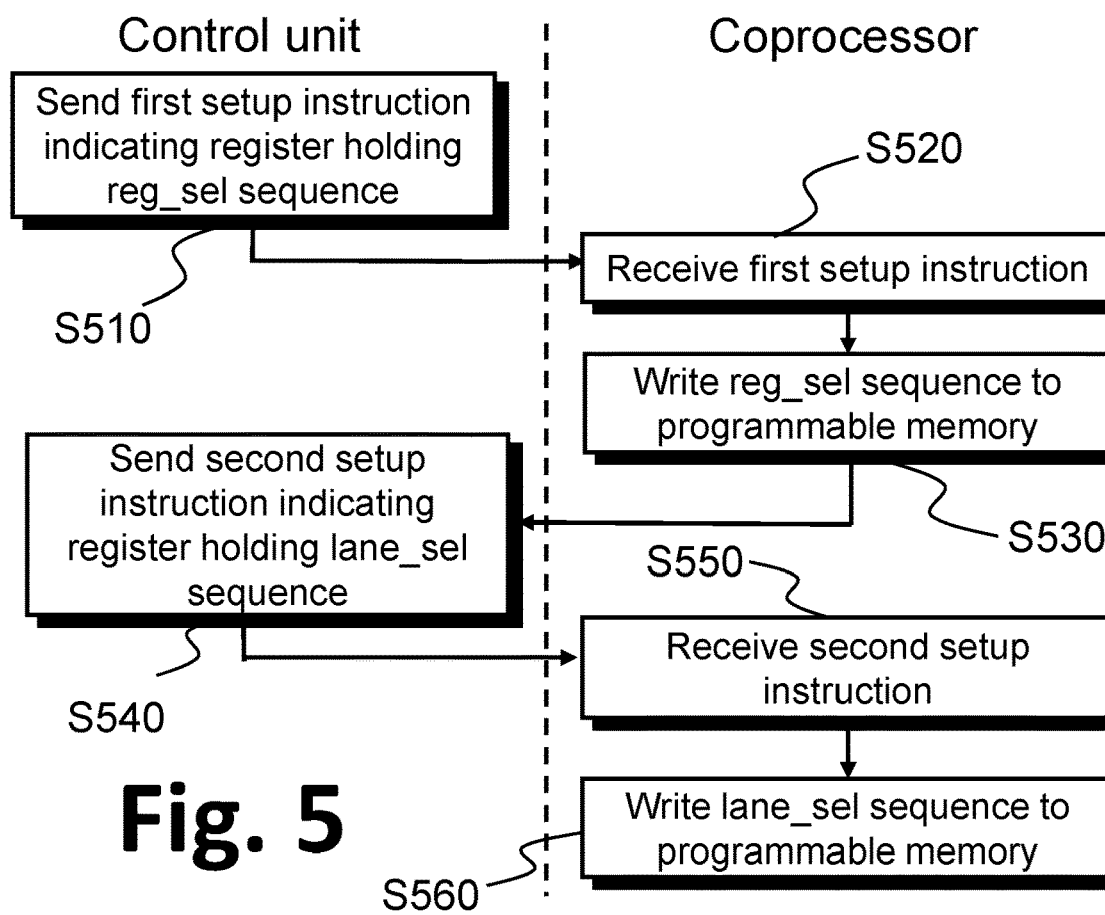
FIG. 5 is a flow diagram representing a setup operation in accordance with the present invention.

As shown in FIG. 5, in order to configure the data stored in the internal storage 230, the control unit 130 sends, at S510, a first setup instruction to the coprocessor 220 indicating one or more first registers in the 32-bit register array 140 of the CPU 110 in which reg_sel data is stored. In response to receiving the first setup instruction at S520, the coprocessor 220 writes, at S530, the reg_sel data from the one or more first registers to the internal storage 230. The control unit 130 sends, at S540, a second setup instruction to the coprocessor 220 indicating one or more second registers in the 32-bit register array 140 of the CPU 110 in which lane_sel data is stored. In response to receiving the second setup instruction at S550, the coprocessor writes, at S560, the lane_sel data from the one or more second register arrays to the internal storage 230. It is emphasised that the routine of FIG. 5 is only an example. More generally, control data is written to internal storage in response to a setup instruction being received from a control unit.

Swizzle operations allow data to be transferred and rearranged within the register array 210, such that the data is appropriately arranged for the coprocessor 220 to perform vector operations. As will be demonstrated hereafter with reference to specific examples, in some cases only a relatively small number of different swizzle operations are necessary for a given data processing routine. In this example, the internal storage 230 includes multiple internal registers for storing control data, such that the stored control data can be reused quickly and efficiently in a data processing routine where several different swizzle instructions are used repeatedly.

Figure 6:
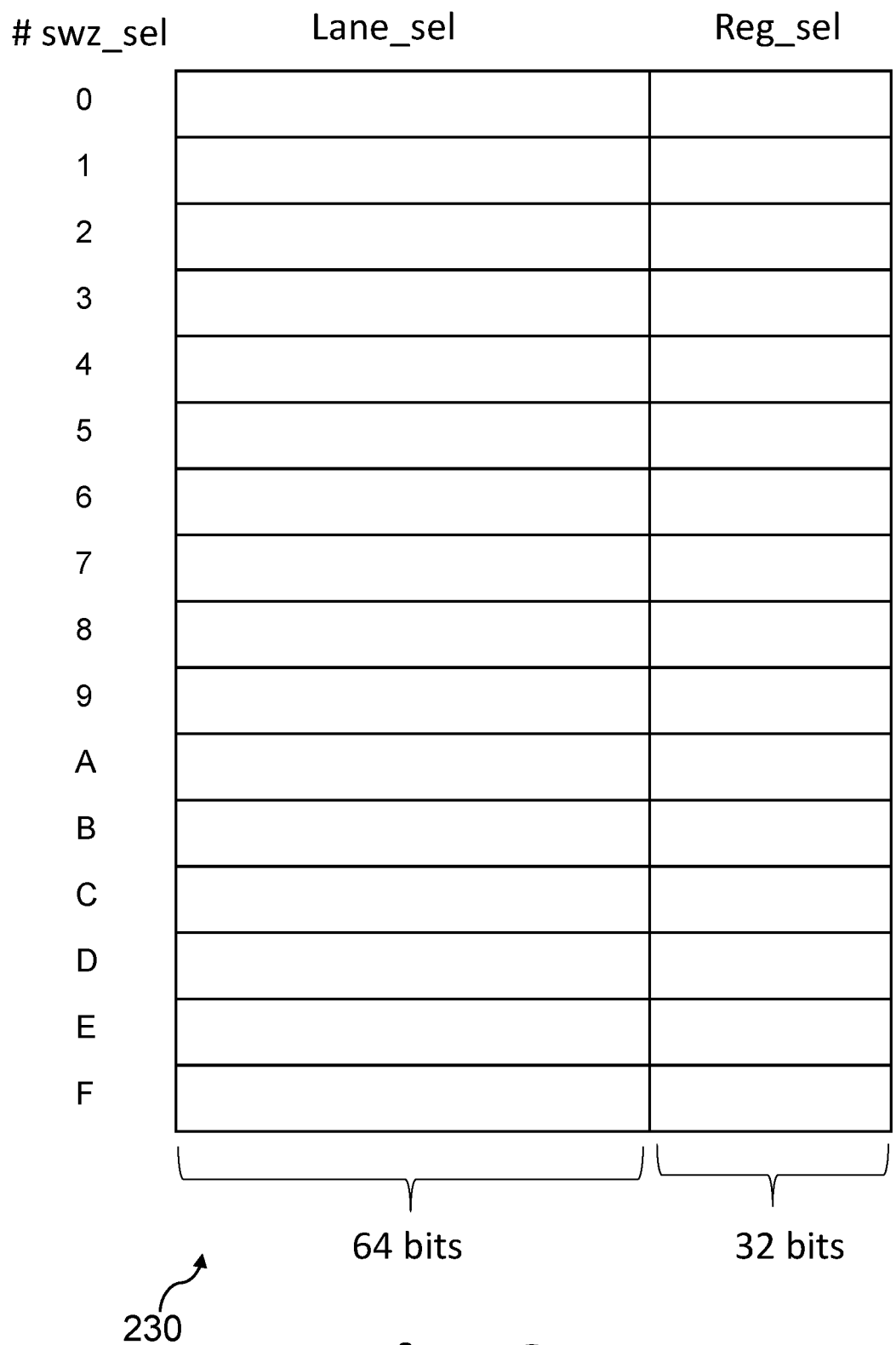
FIG. 6 is a schematic block diagram representing internal storage accessible by a coprocessor.

In some examples, internal storage may include a plurality of storage regions, each arranged to store respective control data for a particular swizzle operation. FIG. 6 shows the arrangement of internal storage 230, which includes an internal register array containing several internal registers. In this example, the internal register array includes sixteen internal registers, each having a 4-bit "#swz_sel" index. Each of the internal registers includes a respective first slot for storing reg_sel data, and a respective second slot for storing lane_sel data. In this example, each of the internal registers is configured to specify a swizzle operation that selects data from up to four designated source registers. Each of the internal registers accordingly includes a first slot having 32 bits for storing reg_sel data (corresponding to sixteen 2-bit data words), and a second slot having 64 bits for storing lane_sel data (corresponding to sixteen 4-bit data words). In other examples, slots for storing reg_sel data and lane_sel data may have include a different number of bits, as register arrays may have more or fewer lanes than sixteen, and swizzle instructions may select data from more or fewer than four source registers. In the present example, a single internal register is used to store lane_sel and reg_sel data for a particular swizzle operation. In other examples, lane_sel data and reg_sel data may be stored in separate internal registers, which accordingly may be indexed separately from one another.

In an example in which internal storage includes a plurality of storage regions, a swizzle instruction may further indicate one of the plurality of storage regions, such that the data selected for the swizzle operation is selected from vector lanes in accordance with control data stored in the indicated control region. In an example in which the internal storage is arranged as shown in FIG. 6, a swizzle instruction may indicate one of the plurality first storage slots and one of the plurality of second storage slots. Accordingly, data transferred from one or more source registers to a destination register comprises an ordered selection of words, each word in the ordered selection selected from a vector lane of one of the designated source registers in accordance with respective reg_sel data stored in the indicated first storage slot and respective lane_sel data stored in the indicated second storage slot.

As discussed above, processing data using vector operations can result in reduced memory bandwidth and computation time for applications where the same data processing operation, or a relatively small set of data processing operations, are executed on a large number of data elements (where a data element may be, for example, a single data word). In order for the coprocessor 220 to perform vector operations, in the present example the control unit 130 is operable to send a vector operation instruction to the coprocessor 220 indicating one or more of the registers in the register array 210. The one or more registers may include registers previously designated as destination registers for a swizzle operation, and accordingly contain data that has undergone a swizzle operation and is appropriately arranged for the vector operation. In response to receiving the vector operation instruction, the coprocessor 220 is arranged to perform a logical vector operation on data stored in the one or more registers indicated in the vector operation instruction.

Figure 7:
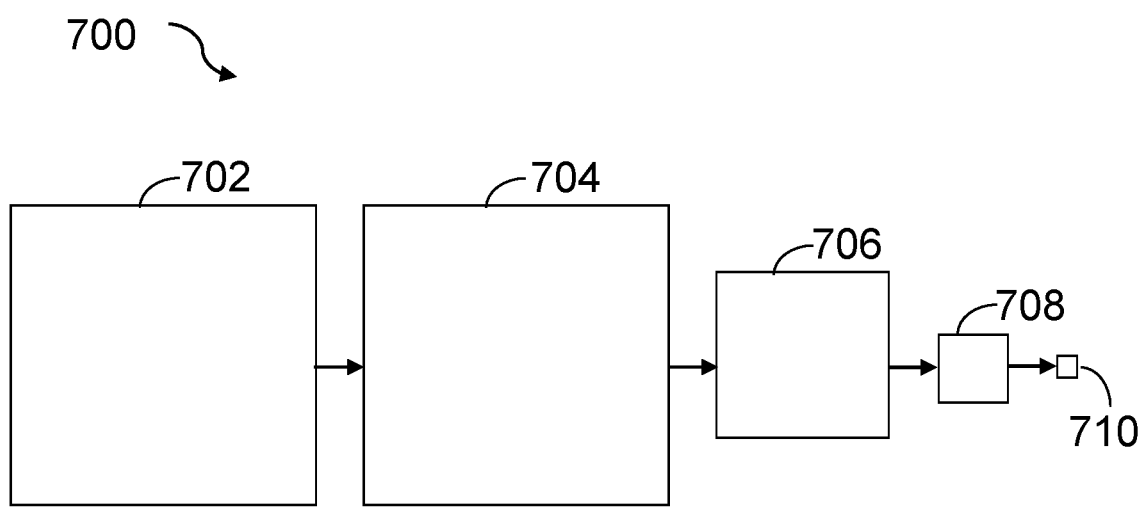
FIG. 7 is a schematic block diagram showing components of a convolutional neural network (CNN)

Various examples in which a relatively small set of data processing operations is executed on a large number of data elements arise in the processing of image data or feature map data within a CNN. FIG. 7 shows an example of a CNN 700 configured to classify image data in accordance with the present invention.

The CNN 700 includes a number of different layers, of which layers 702, 704, 706, 708, and 710 are shown in FIG. 7. The CNN 700 in this example includes an input layer 702, a plurality of convolutional layers (two of which, 702 and 704, are shown in FIG. 3), a number of fully connected layers (one of which, 708, is shown in FIG. 3) and an output layer 710. It is to be appreciated that the CNN 700 of FIG. 7 has been simplified for ease of illustration and that typical neural networks may be significantly more complex.

The input layer 702 corresponds with an input to CNN 700, which in this example is image data. The image data is for example 224 pixels wide and 224 pixels high and includes 3 colour channels (such as a red, green and blue colour channel). The convolutional layers typically extract particular features from the input data, to create feature maps, and may operate on small portions of an image. The fully connected layers then use the feature maps for classification of the image data.

A neural network typically includes a number of interconnected nodes, which may be referred to as neurons. The internal state of a neuron (sometimes referred to as the activation) typically depends on an input received by the neuron. The output of the neuron then depends on the input and the activation. The output of some neurons is connected to the input of other neurons, forming a directed, weighted graph in which edges (corresponding to neurons) or vertices (corresponding to connections) of the graph are associated with weights, respectively. The weights may be adjusted throughout training, altering the output of individual neurons and hence of the neural network as a whole.

In the example of FIG. 7, the CNN 700 has been trained to classify image data, for example to determine whether a particular object is present in the image represented by the image data. Training the CNN 700 in this way for example generates one or more kernels and biases associated with at least some of the layers (such as layers of the CNN 700 other than the input layer 702 and the output layer 710). The kernels for example allow features of an image to be identified. For example, some of the kernels may be used to identify edges in the image represented by the image data and others may be used to identify horizontal or vertical features in the image (although this is not limiting, and other kernels are possible). The precise features that the kernels identify will depend on the object that the CNN 700 is trained to identify. The kernels may be of any size. As an example, each kernel may be a 3 by 3 matrix, which may be convolved with the image data with a stride of 1. The kernels may be convolved with an image patch (or a feature map obtained by convolution of a kernel with an image patch) to identify the feature the kernel is designed to detect. Convolution generally involves adding each pixel of an image patch (in this example a 3 by 3 image patch) to its neighbouring pixels, weighted by the kernel. A stride refers to the number of pixels a kernel is moved by between each operation. A stride of 1 therefore indicates that, after calculating the convolution for a given 3 by 3 image patch or input feature map patch, the kernel is slid across the image by 1 pixel and the convolution is calculated for a subsequent image patch or input feature map patch. This process may be repeated until the kernel has been convolved with the entirety of the image or input feature map (or the entire portion of the image for which a convolution is to be calculated). A kernel may sometimes be referred to as a filter kernel or a filter. A convolution generally involves a multiplication operation and an addition operation (sometimes referred to as an accumulation operation). Thus, a neural network accelerator, such as the CNNA 120 of FIG. 1, may include one or more MAC units configured to perform these operations efficiently.

In general, neural networks such as the CNN 700 of FIG. 7 may undergo what is referred to as a training phase, in which the neural network is trained for a particular purpose. A CNN may be trained either by the computing device 100 or by an external computing device or computing system, for example using a GPU. The output of the training may be a plurality of kernels and biases associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, as part of the convolution of the kernel with the image patch.

After the training phase, the trained CNN 700 may be used to classify input data, for example image data. For example, the CNN 700 may be used to identify whether the object the CNN 700 has been trained to identify is present in a given input image. Classification typically involves convolution of the kernels obtained during the training phase with image patches of the input image.

In the example of FIG. 7 the output of the second layer 704 undergoes further processing before being input to the third layer 706. In this example, the second layer 704 performs pooling and the application of an activation function before passing data to the third layer 706.

An activation function (sometimes referred to as a rectifier) may be used to map an input to a predefined output, such as a value which is 0 or greater. A suitable activation function is the rectified linear unit (ReLU) function, although other activation functions are possible. By using an activation function, non-linearity may be introduced to the output of a convolutional layer, which increases the expressiveness of features maps that may be generated by subsequent convolutional layers.

Pooling aggregates or combines values for a region of an image or a feature map, for example by taking the highest value within a region or taking the average value within a region. In some examples, this reduces the size of the feature map input to the subsequent layer of the CNN 700, and accordingly reduces the amount of computation for subsequent layers of the CNN 700. This is shown schematically in FIG. 7 as a reduction in size of the third layer 706 compared to the second layer 704. Further pooling is performed by the third layer 706 and by the fourth layer 708. In other examples, pooling does not reduce the size of a feature map. Specific examples of pooling are discussed below with reference to FIGS. 8A-13. Pooling may be performed before or after application of an activation function.

Pooling involves performing the same operations on a large number of data elements, and is accordingly well-suited to the application of vector processing. However, data output by a layer of a neural network is generally not formatted correctly for the direct application of vector processing. For example, in a given clock cycle, a MAC engine such as the MAC engine 200 of FIG. 1 may process multiple data elements, and write data to one or more vector registers of the register array 210. However, the data output by the MAC engine 200 is generally interleaved and not arranged correctly for vector processing. Swizzle operations may be performed on the interleaved data in order to arrange the data correctly for vector processing. In an example where the MAC engine 200 outputs data representing a portion of a feature map, different swizzle operations may be applied to the different portions. However, the number of different swizzle operations may be relatively small, with each of the swizzle operations being performed multiple times. Accordingly, the storing of multiple swizzle instructions by the internal storage 230 may allow for the pooling operation to be performed using relatively compact swizzle instructions, and with few or no accesses to the SRAM 190 of the CNNA 120 or the external storage 150.

Data output by different layers in a neural network may be processed differently, for example by applying an activation function and/or pooling the output of one or more of the layers. Furthermore, different network architectures may involve different processing routines. Accordingly, it is desirable for a neural network accelerator such as CNNA 120 to have the flexibility to perform different combinations of data processing operations, whilst taking advantage of the efficiency of performing vector operations using compact swizzle instructions. As discussed above, the internal storage 230 is programmable, allowing for different sets of swizzle instructions to be stored for different processing routines.

Figures 8A, 8B:
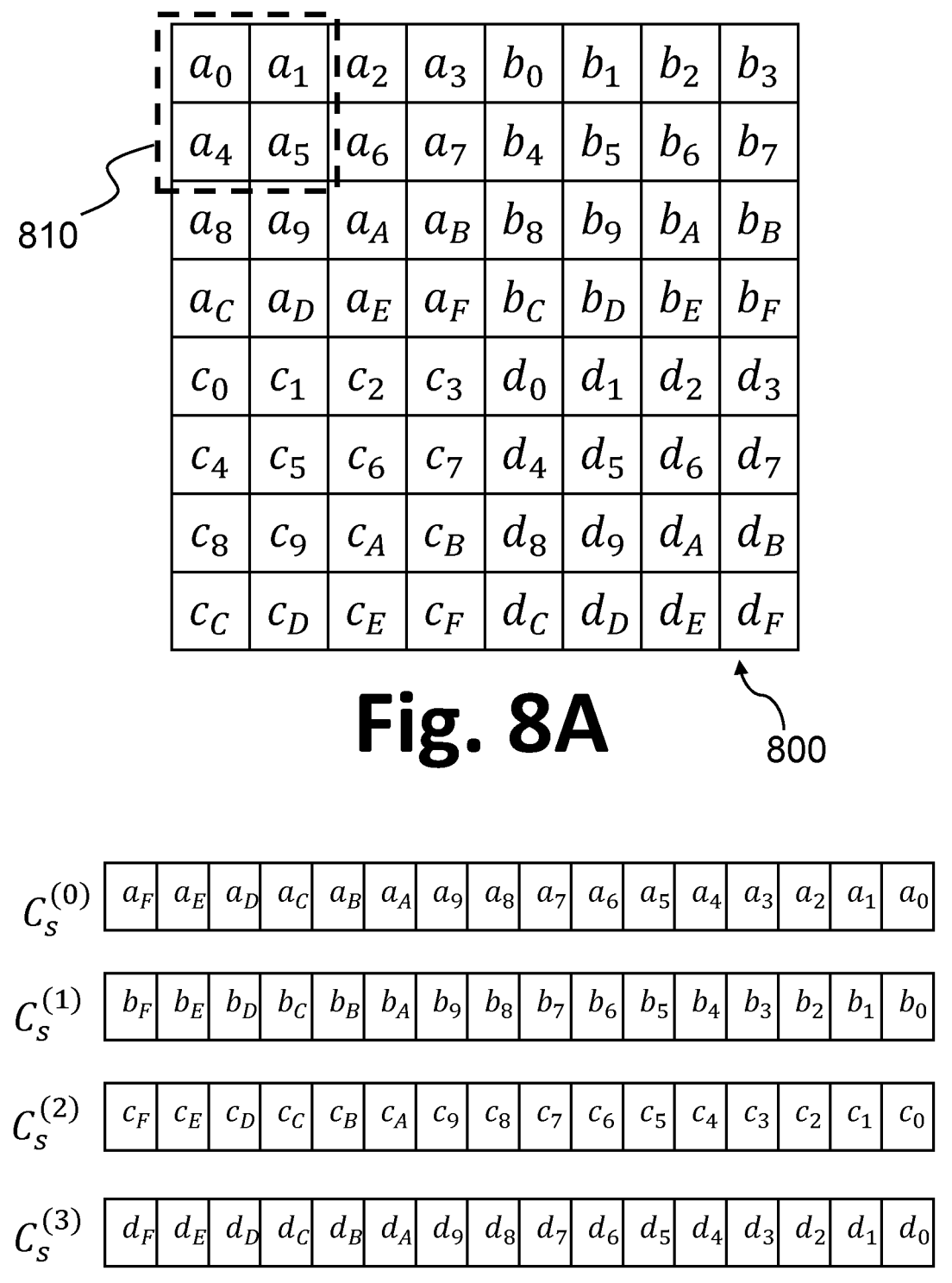

FIGS. 8A and 8B show an example of data output by the MAC engine 200 as part of a convolution operation within a convolutional layer of a CNN. In this example, the MAC engine 200 convolves input data representing a portion of an input feature map with kernel data to generate intermediate data representing a portion of an output feature map. In this example, the MAC engine 200 writes data directly to registers of the register array 210, and accordingly avoids transferring data to the SRAM 190 of the CNNA 120 or the external storage 150 of the computing device 100. Output data generated by the MAC engine 200 over two clock cycles is shown FIG. 8A, and corresponds to an 8×8 portion of the output feature map. Note that the entire output feature map may be significantly larger than the 8×8 portion, for example containing 224×224×3 elements, and the number and arrangement of elements will depend on which layer of the CNN generates the output feature map. In any case, the input feature map is processed by the MAC engine 200 in portions, and accordingly the output feature map is generated in portions. In this example, the MAC engine 200 writes output data corresponding to a portion of the output feature map into four registers $C_S^{(0)}$, $C_S^{(1)}$, $C_S^{(2)}$, $C_S^{(3)}$ of the register array 210, as shown in FIG. 8B.

In this example, the control unit 130 is configured to send a series of swizzle instructions and vector operation instructions to the coprocessor 220, causing the coprocessor 220 to perform a series of operations corresponding to a pooling operation on the feature map generated using the MAC engine 200. In this example, the pooling operation is 2×2 max pooling with stride 2. Accordingly, the highest value within each 2×2 patch of the feature map is determined before being passed to the subsequent layer of the CNN. This results in a reduction of the size of the feature map by a factor of four. In the present example, the first element passed to the subsequent layer is the highest of the values $a_0$, $a_1$, $a_4$, $a_5$, which are contained within the dashed box 810 of FIG. 8A. The second element is the highest of the values $a_2$, $a_3$, $a_6$, $a_7$, and so on. In order to perform the pooling operation using vector processing, swizzle operations using four different #swz_sel indexes are used. The results of each of the four swizzle operations are shown in FIG. 9. For each swizzle operation, the respective control data (reg_sel data and lane_sel data) is shown, where the source registers $C_S^{(0)}$, $C_S^{(1)}$, $C_S^{(2)}$, $C_S^{(3)}$ are indexed 0, 1, 2, 3 respectively. The resulting sequence of words written to the respective destination registers $C_d^{(0)}$, $C_d^{(1)}$, $C_d^{(2)}$, $C_d^{(3)}$, also shown. After the four swizzle operations have been performed, the pooling operation is completed by executing three logical vector max operations. In an example, the first vector max operation may read data from the registers $C_d^{(0)}$, $C_d^{(1)}$, and write the elementwise maximum of the data in these registers to a further register $C_f^{(0)}$. The second vector max operation may read data from the registers $C_d^{(2)}$, $C_d^{(3)}$, and write the elementwise maximum of the data in these registers to a further register $C_f^{(1)}$. The third vector max operation may read data from the registers $C_f^{(0)}$, $C_f^{(1)}$, and write the elementwise maximum of the data in these registers to a final register $C_f^{(2)}$. The register $C_f^{(2)}$ then contains the result of the 2×2 max pooling operation. It is noted that different swizzle operations and/or vector max operations may performed in other examples, and operations may be performed in a different order.

Figure 10:
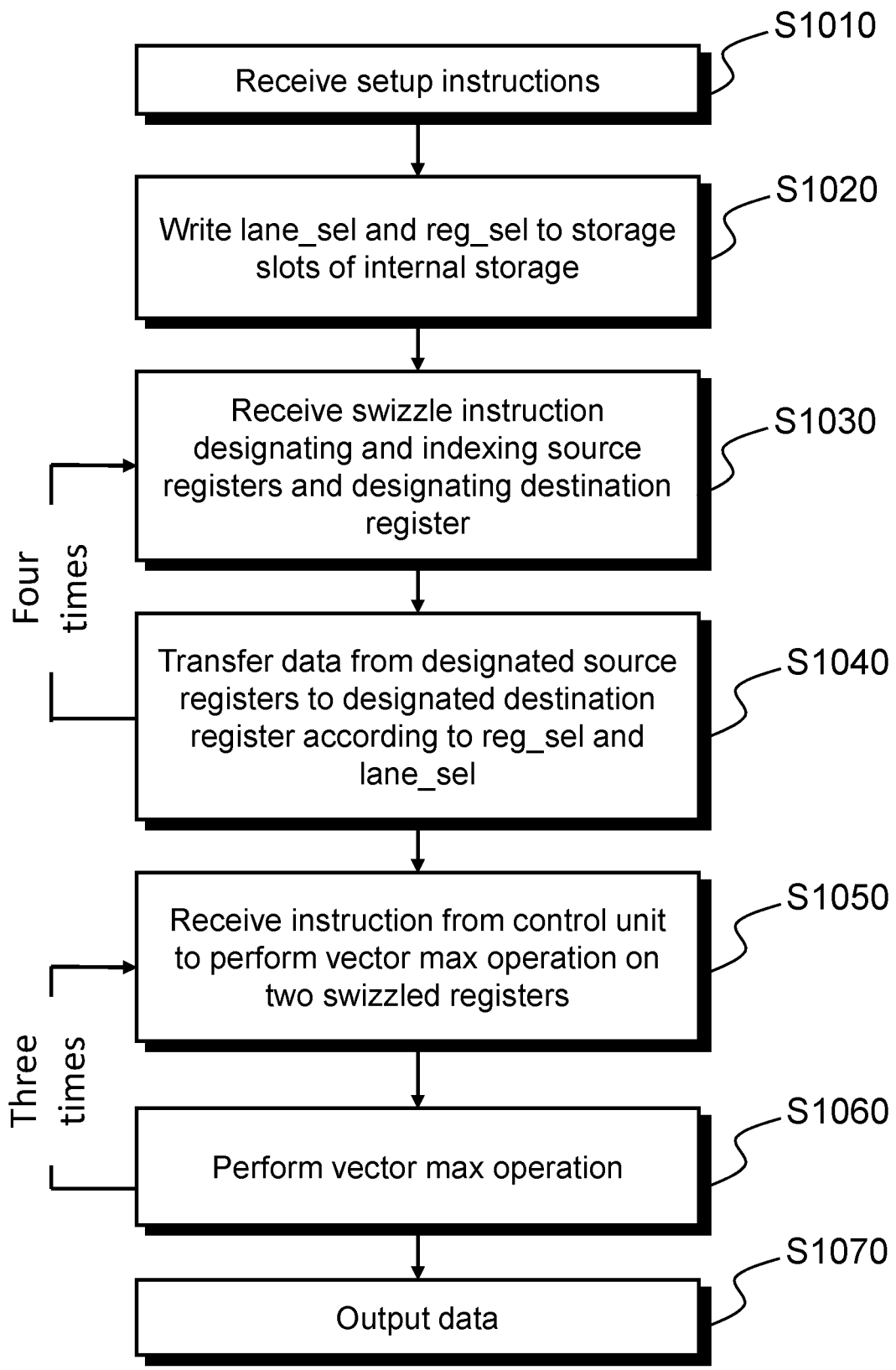
FIG. 10 is a flow diagram representing a max pooling operation.

FIG. 10 shows an example of a routine executed by the coprocessor 220 to perform the max pooling operation described above with reference to FIGS. 8A, 8B and 9. The coprocessor 220 receives, at S1010, setup instructions indicating registers within the 32-bit register array storing the four sets of reg_sel data and the four sets of lane_sel data corresponding to the four swizzle operations shown in FIG. 9. The setup instructions further contain 4-bit #swz_sel indexes, each of which specifies an internal register in the internal storage 230. In this example, each internal register contains a respective first storage slot for storing reg_sel data and a respective second storage slot for storing lane_sel data. The coprocessor 220 writes, at 51020, the reg_sel data and the lane_sel data from the indicated registers to the storage slots indicated by the #swz_sel indexes contained in the setup instructions. In this example, the reg_sel data and the lane_sel data for each of the four swizzle operations is stored in a respective register in the internal storage 230, where the respective registers are indexed 0, 1, 2, 3.

The coprocessor 220 receives, at S1030, a swizzle instruction designating and indexing the four registers in the register array 210 as source registers, and designating one register in the register array 210 as a destination register. In this example, the source registers $C_s^{(0)}, C_s^{(1)}, C_s^{(2)}, C_s^{(3)}$ are indexed 0, 1, 2, 3 respectively. The swizzle instruction further contains a 4-bit #swz_sel index, indicating an internal register within the internal storage 230 of the coprocessor 220. As mentioned above, the indicated internal register includes a first slot containing reg_sel data and a second slot containing lane_sel data.

In response to receiving the swizzle instruction, the coprocessor 220 selects, at S1040, data from the source registers designated by the swizzle instruction and transfers the selected data to the destination register designated by the swizzle instruction. The transferred data comprises a sequence of words, each word selected from a vector lane of one of the designated source registers in accordance with the reg_sel data and the lane_sel data stored in the internal register indicated by the #swz_sel index contained within the swizzle instruction.

The coprocessor 220 performs S1030 and S1040 four times, with each swizzle instruction containing a different #swz_sel index and specifying one of the swizzle operations shown in FIG. 9.

Having performed the four swizzle operations, the coprocessor 220 receives, at S1050, a vector operation instruction from the control unit 130, indicating two of the registers previously designated as destination registers in the swizzle operations of S1030 and S1040. In response to receiving the vector operation instruction, the coprocessor 220 performs, at S1060, the vector max operation specified by the instruction on the data contained within the indicated registers.

The coprocessor 220 performs S1050 and S1060 three times, with three different vector operation instructions, each specifying a vector max operation to be performed on a respective two registers. In this example, the first vector max operation reads data from the registers $C_d^{(0)}, C_d^{(1)}$, and writes the elementwise maximum of the data in these registers to a further register $C_f^{(0)}$. The second vector max operation reads data from the registers $C_d^{(2)}, C_d^{(3)}$, and writes the elementwise maximum of the data in these registers to a further register $C_f^{(1)}$. The third vector max operation reads data from the registers $C_f^{(0)}, C_f^{(1)}$, and writes the elementwise maximum of the data in these registers to a final register $C_f^{(2)}$. The register $C_f^{(2)}$ then contains the result of the 2×2 max pooling operation.

The coprocessor 220 outputs the result of the 2×2 max pooling operation at S1070. In this example, coprocessor 220 writes the data to the SRAM 190, though in other examples the result may remain in the register array 210, for example for further processing by the coprocessor 220. The routine of FIG. 10 is performed for each 8×8 region in the feature map, after which the entire pooling operation is complete.

Figure 11A:
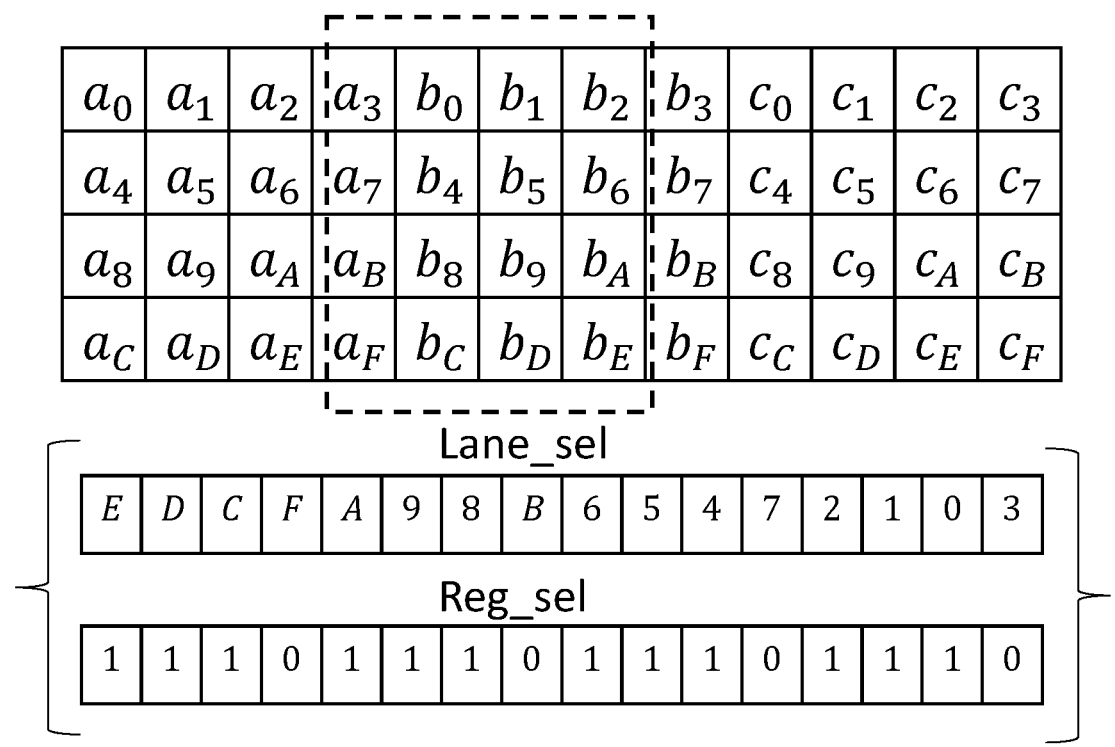
FIGS. 11A-11D show schematically an example of swizzle operations used in an average pooling operation.

FIG. 11A shows a further example of data output by the MAC engine 200 as part of a convolution operation within a convolutional layer of a CNN. As with the example of FIGS. 8A and 8B, the MAC engine 200 convolves input data representing a portion of an input feature map with kernel data to generate output data representing a portion of an output feature map. Data generated by the MAC engine 200 over two clock cycles is shown FIG. 11A, and corresponds to a 4×12 portion of the output feature map. The generated data is stored in three registers of the register array 210, as indicated by the letters $a_i, b_i, c_i$, where the index i denotes a vector lane in the corresponding register.

Figure 11B:
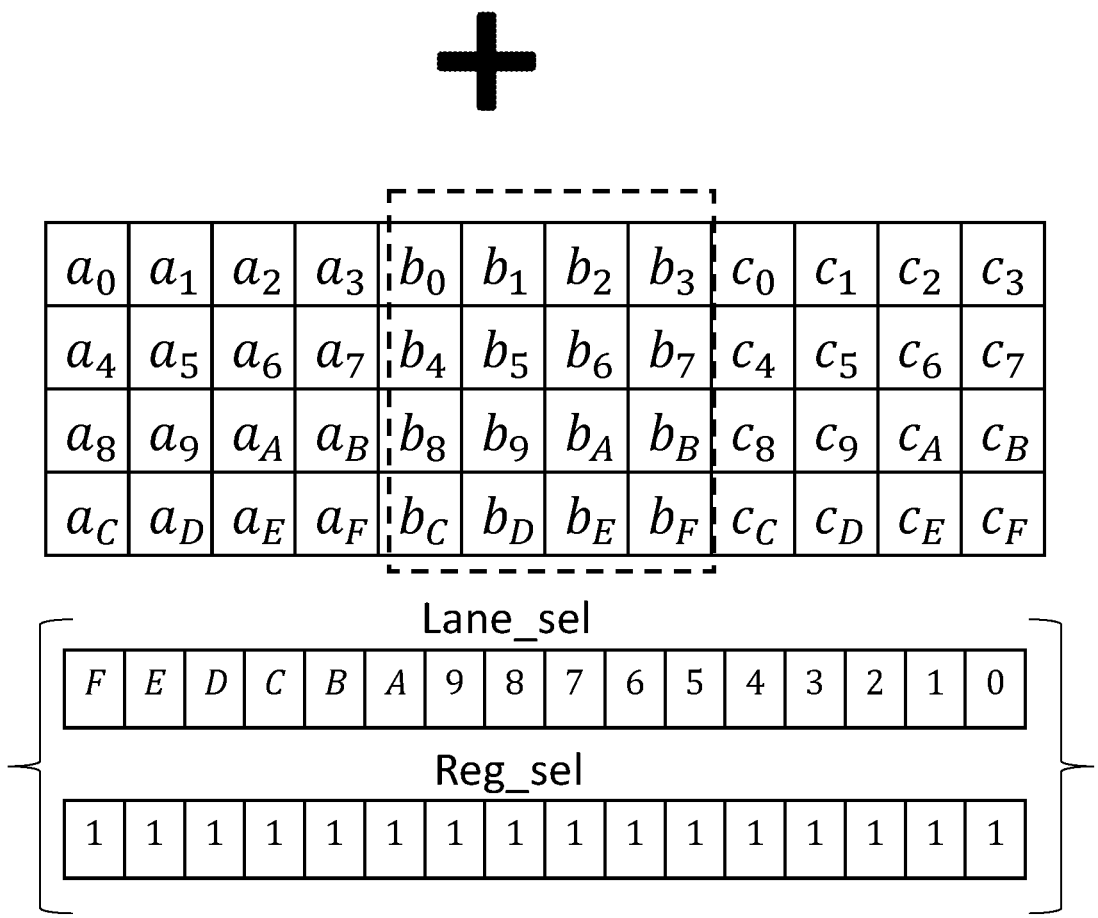
Figure 11C:
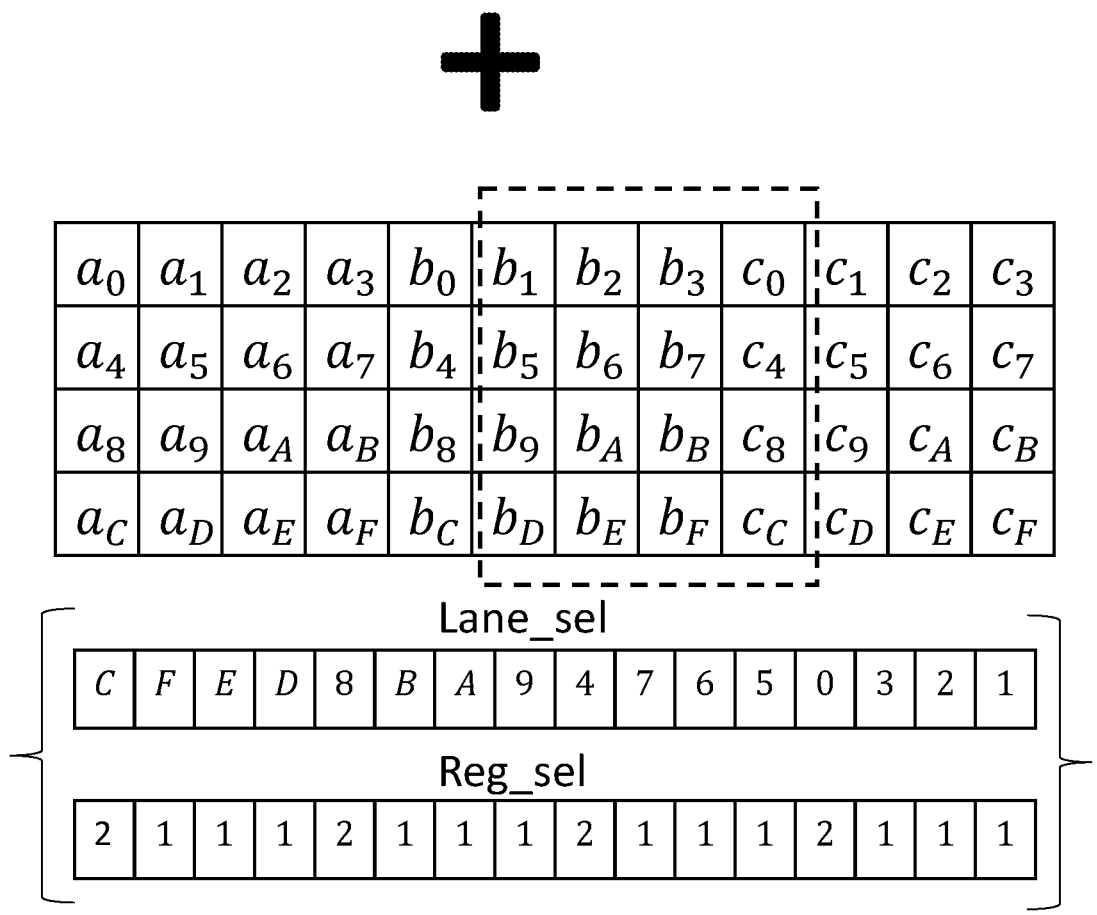

In the example of FIGS. 11A-11D, the control unit 130 is configured to send a series of swizzle instructions and vector operation instructions to the coprocessor 220, causing the coprocessor 220 to perform a series of operations corresponding to a pooling operation on the feature map generated using the MAC engine 200. In this example, the pooling operation is 3×3 average pooling with stride 1. This type of pooling operation is used extensively, for example, in the Inception v3 network. In 3×3 average pooling with stride 1, for each data element in the feature map, the mean value within a 3×3 patch centred on that data element is determined before being passed to the subsequent layer of the CNN. This type of pooling does not result in a reduction in size of the feature map. In order to perform the pooling operation using vector processing, multiple swizzle operations are used, with each swizzle operation being specified by control data indexed by a respective #swz_sel index. The swizzle operation shown in FIG. 11A transfers a first 4×4 patch of output feature map data to a first destination register $C_d^{(0)}$. A second 4×4 patch of output feature map data, which is one data element to the right of the first 4×4 patch, is already stored in a second designated destination register $C_d^{(1)}$, as shown in FIG. 11B, and accordingly no swizzle operation is required (the reg_sel data and the lane_sel data shown in FIG. 11B corresponds to an identity swizzle operation, where data is read from a single source register, and written to single destination register without reordering. This represents a redundant data processing operation, and is therefore omitted, and instead the source register is relabelled as a destination register). The swizzle operation shown in FIG. 11C transfers a third 4×4 patch of the output feature map data to a third designated destination register $C_d^{(2)}$.

Having performed the swizzle operations of FIG. 11A and FIG. 11B, two vector additions are performed to add the data elements stored within the registers $C_d^{(0)}, C_d^{(1)}, C_d^{(2)}$. The result of the two vector addition operations is written to a further register $C_f^{(0)}$, as shown in FIG. 11D.

Figure 11D:

The operations described above, in which a horizontal stride of one is used to sum data elements to generate 4×4 patches such as that shown in FIG. 11D, are performed over the extent of the feature map in order to generate multiple such 4×4 patches, each of which is stored within a separate register. A further set of operations is performed in which a vertical stride of one is used to sum data elements of the generated 4×4 patches, resulting in further 4×4 patches, each stored within a separate register and containing a sum of nine elements of the output feature map (including padding, as will be described hereafter).

Figure 12A:
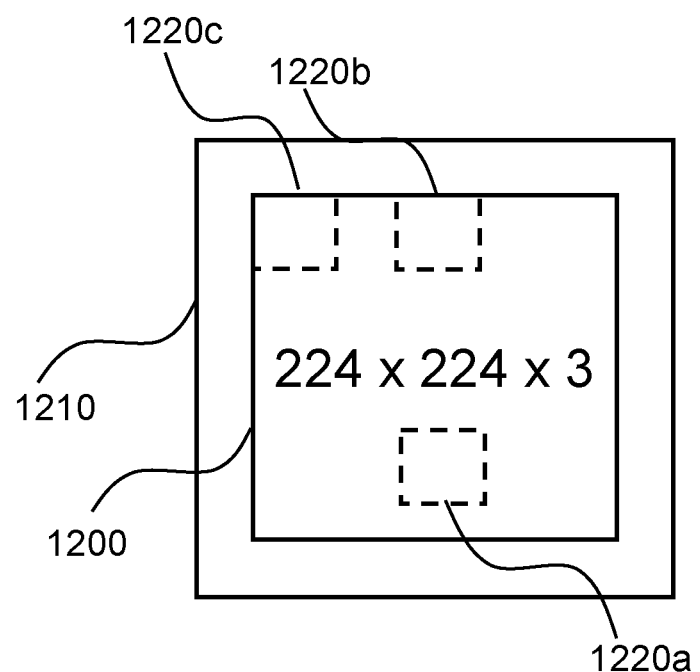

FIG. 12A shows an example of an output feature map 1200 with 224×224×3 elements, corresponding to three channels each having 224×224 elements. The output feature map 1200 is surrounded by padding 1210 of size 1, which is made up of data elements having values of 0. FIG. 12A shows three examples of 4×4 patches 1220a, 1220b, and 1220c of the output feature map 1200 holding data elements from one of the three channels. Each of the 4×4 patches is output by the MAC engine 200 to one of the registers of the register array 210. The coprocessor 220 performs the operations described above with reference to FIGS. 11A-11D in order to generate further 4×4 patches corresponding to each of the 4×4 patches of the output feature map 1200, each element of each 4×4 patch comprising a sum of nine data elements of the output feature map 1200.

In order to generate the average pooled data, the data elements of the further 4×4 patches are required to be divided by normalising values. For most elements of each further 4×4 patch, the normalising value is 9, corresponding to the nine elements of the output feature map summed within the element of the patch. However, for some elements, the normalising values are less than 9, because the patch corresponds to a region of the output feature map near an edge or corner of the output feature map.

In the example of FIG. 12A, patch 1220a is not located adjacent to an edge of the output feature map 1200, and accordingly each element of the corresponding further 4×4 patch needs to be divided by 9. This division by 9 can be performed by the coprocessor 220 as a vector operation, in which data elements in the register holding the further 4×4 patch are simultaneously divided by elements of a register storing sixteen nines, as shown in FIG. 12B.

Patch 1220b is located adjacently to the upper edge of the output feature map 1200. Therefore, the uppermost four elements of the corresponding further 4×4 patch need to be divided by 6, as each of these element includes a sum of six elements of the output feature map 1200, and three zeros from the padding 1210. The sixteen divisions can again be performed by the coprocessor 220 as a vector operation, by simultaneously dividing data elements in the register holding the further 4×4 patch by elements of a register with twelve 9s and four 6s (in the appropriate order), as shown in FIG. 12C.

Patch 1220c is located adjacently to the top left corner of the output feature map 1200. Therefore, six elements of the corresponding further 4×4 patch need to be divided by 6, and one element needs to be divided by 4 (as this element includes a sum of four elements of the feature map, and five zeros from the padding 1210). The sixteen divisions can again be performed by the coprocessor 220 as a vector operation, by simultaneously dividing data elements in the register holding the further 4×4 patch by elements of a register with nine 9s, six 6s, and one 4 (in the appropriate order), as shown in FIG. 12D.

For each of the vector division operations described above, control data is stored in the internal storage 230. In this example, the control data stored for each vector division operation specifies a swizzle operation that transfers an appropriate arrangement of normalising values (i.e. 4s, 6s, and/or 9s) from one or more source registers into a destination register for use in one of the vector division operations. In total, eight sets of control data, corresponding to eight different swizzle operations, are used, corresponding to four edges and four vertices of the output feature map (no swizzle operation is required for the central region, in which the normalising values are all 9s). In this way, the control data takes account of edges of the feature map. In other examples, normalising values may be differently prearranged in registers, such that fewer swizzle operations need to be performed, and/or fewer different sets of control data need to be stored.

Figure 13:
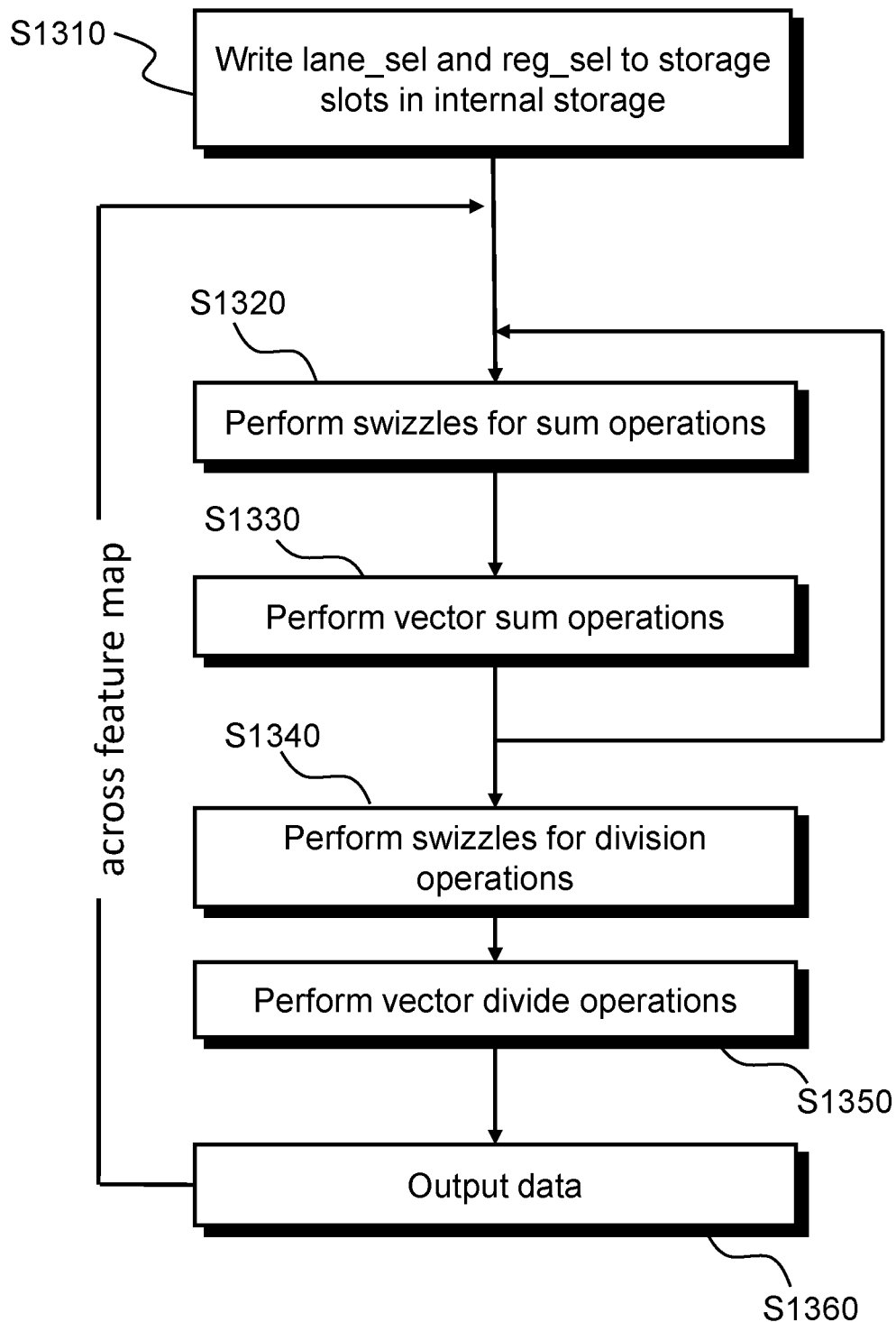
FIG. 13 is a flow diagram representing an average pooling operation.

Processing an entire feature map as described with reference to FIGS. 11A-D and 12A-D in accordance with the present invention results in an efficient implementation of 3×3 average pooling, in which all mathematical operations are performed as vector operations, and few or no intermediate accesses to SRAM 190 or external storage 150 are required. FIG. 13 shows an example of a processing routine performed by the coprocessor 220 in order to implement the 3×3 average pooling. At S1310, the coprocessor 220 writes reg_sel data and lane_sel data to storage slots in the internal storage 230, in accordance with setup instruction data received from the control unit 130.

The coprocessor 220 performs, at S1320, swizzle operations as described with reference to FIGS. 11A-D, in order to arrange output feature map data for a first set of vector sum operations (using horizontal stride 1). The coprocessor then performs, at S1330, the first set of vector sum operations to output 4×4 patches such as that shown in FIG. 11D. The coprocessor repeats S1320 and S1330 for a second set of vector operations (using vertical stride 1) to output further 4×4 patches of elements, each element comprising a sum of nine data elements from the output feature map 1200.

The coprocessor performs, at S1340, further swizzle operations as described with reference to FIGS. 12A-D, in order to arrange data for a set of vector division operations. The swizzle operations of S1340 are performed on one or more source registers holding the normalisation values 4, 6, and 9. The coprocessor 220 performs the vector division operations at S1350.

The coprocessor 220 outputs the result of the 3×3 average pooling operation at S1360. In this example, coprocessor 220 writes the data to the SRAM 190, though in other examples the result may remain in the register array 210, for example for further processing by the coprocessor 220. The routine of FIG. 13 is performed across the entire feature map. It is noted that the ordering of the steps of FIG. 13 is only an example, and the 3×3 average pooling operation may be performed in a different order, for example performing the first set of vector additions (with horizontal stride 1) across the entire feature map before moving onto the second set of vector additions (with vertical stride 1). Other variants of the routine of FIG. 13 are envisaged, for example one in which the first set of vector additions is performed across the entire feature map, the resulting processed feature map is transposed, and the same first set of vector additions is then performed across the entire processed feature map. This reduces the number of different swizzle instructions, and hence different sets of control data, required for the processing operation.

In some examples, the number of distinct swizzle operations required for a data processing operations may be greater than the number of storage regions in the internal storage directly accessible by a coprocessor. In such examples, the data processing routine may be divided into subroutines, with different control data being written to the internal storage for each of the subroutines. In the example of 3×3 average pooling discussed above, for example, new lane_sel data and reg_sel data may be written to the internal storage 230 after the vector sum operations have been performed, where the new lane_sel data and reg_sel data correspond to swizzle operations for the vector division operations.

In some examples, vector operations may result in the overflow or underflow of one or more data elements. For example, if a vector multiplication is performed on two registers storing 8-bit data, one or more of the resulting elements may be too large to store in 8 bits. In order to account for this, in some examples, a swizzle instruction may zero data in a further register. The further register is arranged to hold the most significant bits of the result of the vector operation, allowing for 16-bit data to be output. In one example, a swizzle instruction is performed in preparation for a vector operation that writes data to a register $C_n$ in the register array 210. In response to receiving the swizzle operation, the coprocessor 220 performs the indicated swizzle operation, and further sets all of the words in a neighbouring register $C_{n+1}$ to zero. In performing the vector operation, the coprocessor 220 writes the least significant 8 bits of each output data element to the register $C_n$ and the most significant bits to the register $C_{n+1}$. In the example of FIGS. 11A-D, 12A-D and 13, in which several vector additions are performed before the vector division, such zeroing of elements may be necessary in order to avoid overflows.

The above embodiments are to be understood as illustrative examples of the invention. Further embodiments of the invention are envisaged. For example, a computing device arranged to classify image data using a neural network may receive image data representing a portion of an image having a first image format. However, the neural network may be trained using image data having a second image format. The present invention may be used to reformat the data in advance of processing by the neural network. In one example, a computing device receives image data in a 24-bit packed RGB format. In 24-bit packed RGB format, for each pixel of an image, values corresponding to R (red), G (green), and B (blue) colour channels are arranged sequentially in an interleaved manner such that the image data is received in the format RGBRGBRGBRGB. A neural network may be trained to receive image data in standard planar RGB format, where the colour channels are not interleaved. By first writing the 24-bit packed RGB data into registers accessible by a processor or coprocessor as described above, the method described herein may be used to efficiently write the image data into destination registers in standard RGB format. It will be appreciated that the same method may be used to convert between a wide range of different image formats. In a further example, image data may additionally be converted from a first image encoding format to a second image encoding format, for example from YUV to RGB or vice-versa. This may be of particular relevance, for example, where video data, which is often encoded in a YUV format, is processed by a neural network. In such an example, the conversion between encoding formats may be performed using vector operations, after swizzle operations are applied in order to arrange the data appropriately (for example, to separate interleaved image data as described above). Such applications of the method to reformatting image data is not limited to examples where the reformatted data is processed by a neural network. Furthermore, the methods and systems described herein are not limited to the processing of image data (or feature map data), but are applicable in a broad variety of applications where interleaved data needs to be separated or rearranged, or where data needs to be interleaved in a particular manner for further processing.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A data processing system comprising:
a processor;
a data interface for communication with a control unit, the processor being on one side of the data interface;
internal storage accessible by the processor, the internal storage being on the same side of the data interface as the processor; and
a register array accessible by the processor and comprising a plurality of vector registers, each vector register having a plurality of vector lanes, wherein:
the internal storage comprises a plurality of storage regions each indexed by a respective index of a series of indexes, a first storage region of the plurality of storage regions being indexed by a first index of the series of indexes,
each of the plurality of storage regions is arranged to store respective control data, the respective control data stored in each storage region specifying a respective ordered selection of vector lanes of one or more source registers in the register array, the respective ordered selection having an equal number of vector lanes to a destination register in the register array; and
the processor is arranged to, in response to receiving instruction data comprising the first index from the control unit via the data interface, transfer data to the destination register from the respective ordered selection of vector lanes indicated by the respective control data stored in the first storage region.

2. The data processing system of claim 1, wherein the processor is arranged to, in response to receiving instruction data from the control unit indicating a subset of the plurality of registers, designate the indicated subset as the one or more source registers.

3. The data processing system of claim 1, wherein the processor is arranged to, in response to receiving setup data from the control unit, write the respective control data to the first storage region.

4. The data processing system of claim 1, wherein the processor is operable to perform a logical vector operation on data stored in one or more vector registers in the register array.

5. The data processing system of claim 1, wherein the internal storage stores control data for performing a pooling operation on a feature map within a convolutional layer of a convolutional neural network (CNN).

6. The data processing system of claim 1, comprising one or more multiply-accumulate (MAC) units, wherein:
each of the one or more MAC units is configured to perform a MAC operation to process input data as part of a convolution operation within a convolutional layer of a convolutional neural network (CNN); and
the data transferred to the destination register represents a portion of a feature map generated using the one of more MAC units.

7. The data processing system of claim 1, wherein:
the data transferred to the destination register represents a portion of an image having a first colour format; and
the internal storage stores control data for converting the portion of the image from the first colour format to a second colour format.

8. The data processing system of claim 1, wherein the processor is operable to, in response to receiving the instruction data, zero data in a further register.

9. The data processing system of claim 1, wherein the processor is a coprocessor.

10. A computer-implemented method of processing data comprising a processor on one side of a data interface for communication with a control unit:
receiving, from the control unit, instruction data comprising a first index of a series of indexes respectively indexing a plurality of storage regions of internal storage accessible by the processor and on the same side of the data interface as the processor, a first storage region of the plurality of storage regions being indexed by the first index, wherein each of the plurality of storage regions is arranged to store respective control data, the respective control data stored in each storage region specifying a respective ordered selection of vector lanes of;

one or more source registers in a register array accessible to the processor and comprising a plurality of vector registers, each vector register having a plurality of vector lanes, the respective ordered selection having an equal number of vector lanes to a destination register in the register array; and responsive to receiving the instruction data comprising the first index, transferring data to the destination register from the respective ordered selection of vector lanes indicated by the respective control data stored in the first storage region.

11. The computer-implemented method of claim 10, comprising the processor
writing, in response to receiving setup data from the control unit, the respective control data to the first storage region.

12. The computer-implemented method of claim 10, comprising the processor performing a logical vector operation on data stored in one or more vector registers in the register array.

13. The computer-implemented method of claim 10, wherein the transferring of the data is part of a pooling operation performed on a feature map within a convolutional layer of a convolutional neural network (CNN).

14. The computer-implemented method of claim 13, wherein the transferring of the data takes account of edges of the feature map.

15. The computer-implemented method of claim 10, comprising processing, by one or more multiply-accumulate (MAC) units, input data as part of a convolution operation within a convolutional neural network,
wherein the transferred data represents a portion of a feature map generated using the one or more MAC units.

16. The computer-implemented method of claim 10, wherein:
the transferred data represents a portion of an image having a first colour format; and
the transferring of the data is for converting the portion of the image from the first colour format to a second colour format.

17. The computer-implemented method of claim 10, comprising the processor zeroing, in response to receiving the instruction data, data in a further register.

* * * * *